United States Patent
Frederiksen et al.

(10) Patent No.: US 8,839,656 B2
(45) Date of Patent: Sep. 23, 2014

(54) METHOD OF CHECKING A WIND TURBINE IN A WIND FARM FOR A YAW MISALIGNMENT, METHOD OF MONITORING A WIND TURBINE IN A WIND FARM AND MONITORING APPARATUS

(75) Inventors: Dan Frederiksen, Haderslev (DK); Allan Groenlund Joergensen, Skanderborg (DK)

(73) Assignee: Siemens Aktiengesellschaft, Munich (DE)

( * ) Notice: Subject to any disclaimer, the term of this patent is extended or adjusted under 35 U.S.C. 154(b) by 175 days.

(21) Appl. No.: 13/461,896

(22) Filed: May 2, 2012

(65) Prior Publication Data
US 2012/0279288 A1   Nov. 8, 2012

(30) Foreign Application Priority Data
May 3, 2011 (EP) .................................. 11164587

(51) Int. Cl.
*G01M 19/00* (2006.01)
*F03D 7/02* (2006.01)

(52) U.S. Cl.
CPC .......... *F03D 7/0204* (2013.01); *F05B 2260/80* (2013.01); *F05B 2270/802* (2013.01); *Y02E 10/723* (2013.01)
USPC .................... 73/1.75; 416/1; 416/61

(58) Field of Classification Search
USPC .................. 73/1.27, 1.28, 1.75, 1.79, 170.01, 73/170.05, 455; 416/1, 61
See application file for complete search history.

(56) References Cited

U.S. PATENT DOCUMENTS

| | | | | |
|---|---|---|---|---|
| 7,244,100 | B2 * | 7/2007 | Yoshida | 416/9 |
| 8,269,361 | B2 * | 9/2012 | Egedal | 290/44 |
| 8,353,667 | B2 * | 1/2013 | Hoffmann | 416/37 |
| 8,410,625 | B2 * | 4/2013 | Stiesdal | 290/44 |
| 2003/0160456 | A1 | 8/2003 | Wobben | |
| 2008/0078228 | A1 * | 4/2008 | Nies | 73/1.01 |
| 2009/0232652 | A1 | 9/2009 | Keller | |
| 2010/0054939 | A1 * | 3/2010 | Hoffmann | 416/10 |
| 2010/0087960 | A1 * | 4/2010 | Hayashi et al. | 700/287 |
| 2010/0133827 | A1 * | 6/2010 | Huang et al. | 290/44 |
| 2010/0143124 | A1 * | 6/2010 | Qian et al. | 416/1 |
| 2011/0135469 | A1 * | 6/2011 | Scholte-Wassink | 416/1 |
| 2011/0210549 | A1 * | 9/2011 | Haag et al. | 290/44 |
| 2013/0004312 | A1 * | 1/2013 | Friedrich et al. | 416/1 |
| 2013/0300115 | A1 * | 11/2013 | Seem et al. | 290/44 |

FOREIGN PATENT DOCUMENTS

| | | |
|---|---|---|
| DE | 102009005215 B3 | 6/2010 |
| EP | 2154362 A1 | 2/2010 |
| EP | 2189656 A2 | 5/2010 |
| EP | 2290488 A1 | 3/2011 |
| JP | 2007285214 A | 11/2007 |

* cited by examiner

*Primary Examiner* — Eric S McCall

(57) ABSTRACT

A method of checking a wind turbine in a wind farm with a number of wind turbines for a yaw misalignment is provided. In this method, the yaw angles of at least a subset of wind turbines of the wind farm are ascertained, an average yaw angle is established from the ascertained yaw angles, and a yaw misalignment of the wind turbine to be checked is identified by a deviation of its yaw angle from the average yaw angle by more than a threshold value.

12 Claims, 2 Drawing Sheets

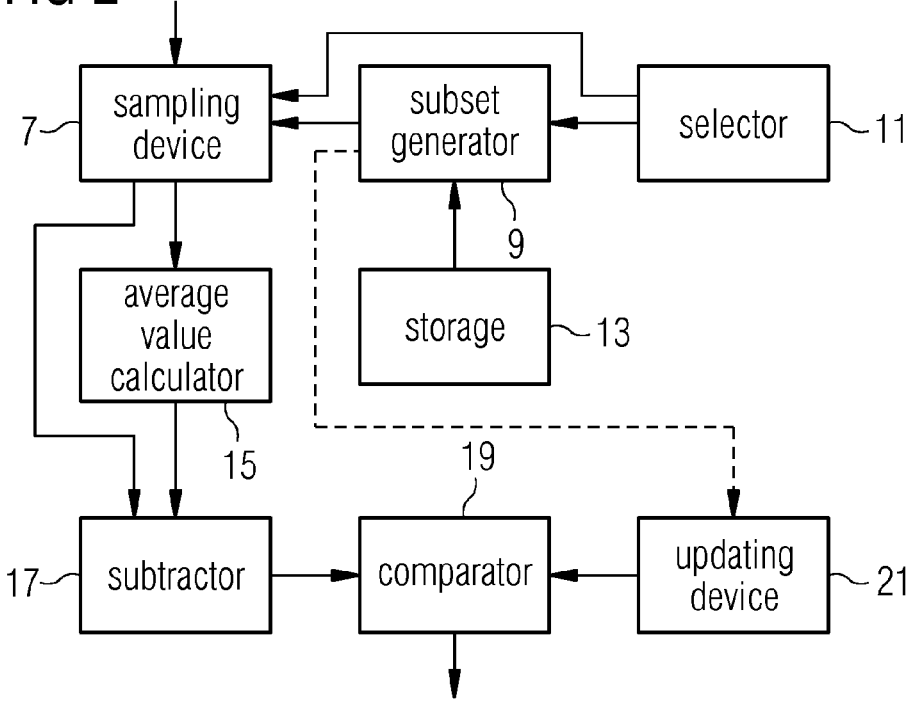
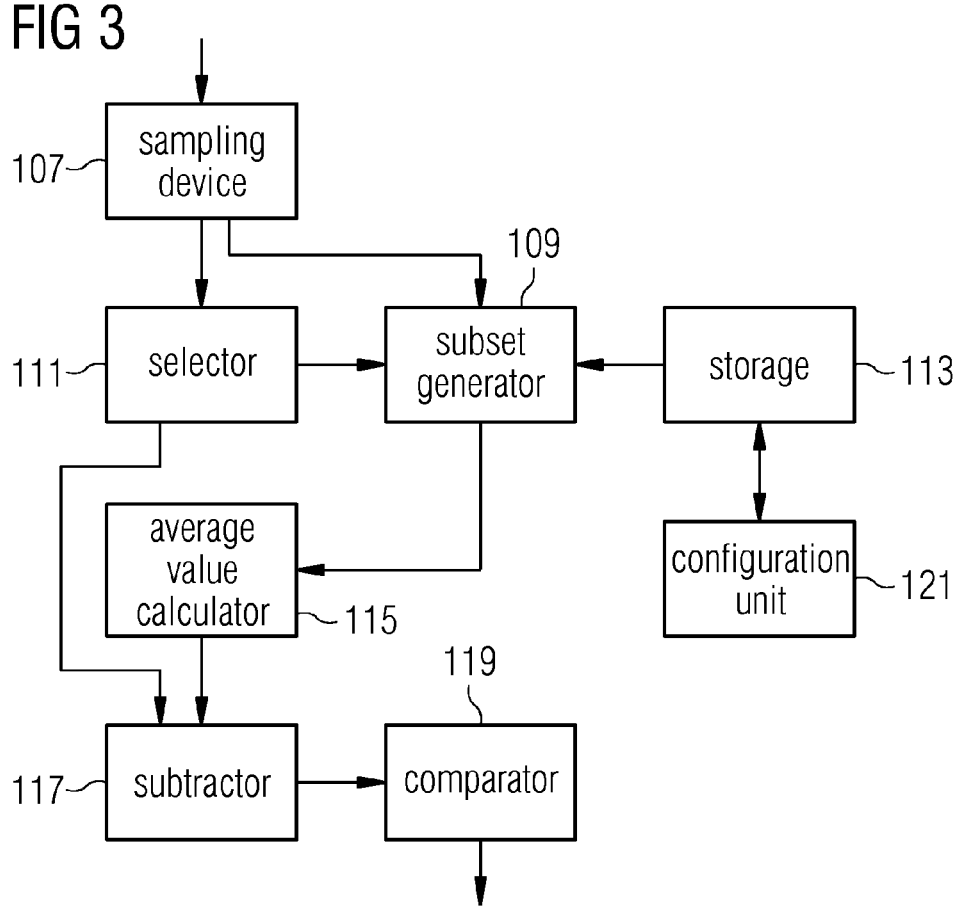

METHOD OF CHECKING A WIND TURBINE IN A WIND FARM FOR A YAW MISALIGNMENT, METHOD OF MONITORING A WIND TURBINE IN A WIND FARM AND MONITORING APPARATUS

CROSS REFERENCE TO RELATED APPLICATIONS

This application claims priority of European Patent Office Application No. 11164587.5 EP filed May 3, 2011. All of the applications are incorporated by reference herein in their entirety.

FIELD OF INVENTION

A method of checking a wind turbine in a wind farm comprising a number of wind turbines for a yaw misalignment is provided. In addition, a method of monitoring wind turbines in a wind farm for a yaw misalignment is provided as well as a monitoring apparatus for identifying a yaw misalignment of a wind turbine in a wind farm.

BACKGROUND OF INVENTION

Horizontal axis wind turbines have rotors with horizontal rotor shafts located at the top of a tower. The rotor shaft must be pointed in the wind in order to extract wind energy. To keep power generation by a horizontal axis wind turbine in an optimum range the rotor is typically rotated about a vertical axis in case of a change of the wind direction so as to follow the wind direction. The angle by which the rotor is rotated during this process is called yawing angle or azimuth angle. The rotation is performed by a yawing system that typically comprises a ring gear, a number of pinion gears meshing with the ring gear and controller for controlling the yaw angle. Such yawing systems are, for example, disclosed in EP 2 189 656 A2, US 2003/0160456 A1 or US 2009/0232652 A1.

SUMMARY OF INVENTION

However, if any component of the yawing system, like for example, a wind direction sensor, a controller, etc., are defect or wrongly calibrated there is a chance of the wind turbine being misaligned with the wind direction, i.e. that a yaw misalignment occurs. Even small yaw misalignments already reduce the power generation capacity of the misaligned wind turbine considerably.

Up to now, yaw misalignment due to wrongly calibrated or defect components of a yawing system have been found by experts studying a wealth of data from the turbine and making educated guesses followed by site inspection. However, such a procedure affords a considerable expert man power which makes the procedure expensive. Moreover, since studying a wealth of data consumes a considerable amount of time this process is relatively inefficient. Therefore, it is desirable to provide a method of identifying yaw misalignments due to wrongly calibrated or defect components of a yawing system that is less expensive and/or more efficient.

With respect to what is mentioned above it is a first objective to provide an advantageous method of checking a wind turbine in a wind farm for a yaw misalignment. It is a second objective to provide an advantageous method of monitoring wind turbines in a wind farm for a yaw misalignment. It is a third objective to provide an advantageous monitoring apparatus that allows for identifying a yaw misalignment of a wind turbine in a wind farm.

The first objective is solved by a method of checking a wind turbine in a wind farm for a yaw misalignment, the second objective is solved by a method of monitoring wind turbines, and the third objective is solved by a monitoring apparatus as claimed in the independent claims. The depending claims contain further developments.

According to a first aspect, a method of checking a wind turbine in a wind farm comprising a number of wind turbines for a yaw misalignment is provided. In this method, the yaw angles of at least a subset of wind turbines of the wind farm are ascertained. Please note, that the term "subset" should also include the case where all wind turbines of the wind farm form the "subset" so that the yaw angles of all wind turbines in the wind farm are ascertained. In the method, an average yaw angle is established from the ascertained yaw angles and a yaw misalignment of the wind turbine to be checked is identified by a deviation of its yaw angle from the average yaw angle by more than as threshold value.

The method is based on the assumption that for a wind turbine in a wind farm with a number of other wind turbines the yaw angle of the wind turbine should be approximately the same as the average of the yaw angles of its neighbors or the average of the yaw angles of the whole wind farm, i.e. of all wind turbines in the wind farm. If the yaw angle of a wind turbine is found to deviate too much from the average of the yaw angles of its neighbors or of the whole wind farm an alarm can be set that advises a more thorough look and/or a site inspection.

With the method detecting a yaw misalignment caused by wrongly calibrated or defect components of a yawing system can be automated to a higher extend then it was possible in the state of the art. Hence, less expert man power is necessary so that the method is cost saving. In addition, due to the higher degree of automation, wrongly calibrated or defect components of a yawing system can be detected early in a time saving manner which leads to an increase in efficiency as compared to the state of the art procedure. In addition, the method has the potential to reduce downtimes of the wind turbines as well as the duration of reduced power generation by misaligned wind turbine.

The threshold used in the method may be a fixed value. As an alternative, the threshold value may depend on at least one parameter of the wind turbine, e.g. a parameter of the yawing system like the inherent accuracy in determining the wind direction or the accuracy of the control algorithm used in the yawing system, etc., and/or on at least one parameter of the wind farm, e.g. the wake distribution throughout the wind farm, etc., and/or on at least one parameter of the environment, e.g. the actual wind speed, the actual amount of wind speed fluctuations, the actual amount of fluctuations in the wind direction, etc. and/or on the subset of wind turbines used for establishing the average yaw angle, e.g. on the number of wind turbines included in the subset, the distribution of the wind turbines of the subset throughout the wind farm, etc. The use of a threshold value that depends on at least one of the parameters mentioned above and/or on the subset of wind turbines used for establishing the average yaw angle allows for adapting the method to special conditions of individual wind farms or to variations of the conditions prevailing in a wind farm.

The at least one parameter of the wind turbine and/or the at least one parameter of the wind farm and/or the at least one parameter of the environment may be determined continuously or in time steps, and the threshold may be updated continuously or in time steps based on the determined actual value of the respective parameter. By this measure, the method may be adapted automatically and quickly to a change in the conditions prevailing throughout the wind farm.

The subset of wind turbines used in the method may comprise the closest neighbors of the wind turbine to be checked for yaw misalignment. In particular, the subset may only comprise the closest neighbors. However, it is also possible that the subset consists of a weighted distribution in which closer neighbors of the wind turbine to be checked for yaw misalignment receive a higher weight than wind turbines further away from the wind turbine to be checked. Furthermore, it may be possible to include a high number of close neighboring wind turbines into the subset and only a few number of far away wind turbines. Another possibility is that the subset includes all wind turbines of the wind farm, either with equal weights or with differing weights. Please note that it is even possible also to include the wind turbine to be checked for yaw misalignment into the subset. Which type of subset is used in the method may depend on the conditions prevailing in the wind farm or on the accuracy by which a yaw misalignment shall be detected.

According to a further aspect, a method of monitoring wind turbines in a wind farm for a yaw misalignment is provided. In this method, the wind turbines of the wind farm are checked for a yaw misalignment according to the method of checking a wind turbine in a wind farm for a yaw misalignment. The method of monitoring wind turbines in a wind farm allows early indicating of a possible defect or a possible wrong calibration in a yawing system of a wind turbine of the wind farm. In case a yaw misalignment is detected an alarm may be set, for example, an optical alarm and/or an acoustic alarm which indicates an operator of a wind farm that an inspection of the concerned wind turbine may be necessary.

According to a third aspect, a monitoring apparatus for identifying a yaw misalignment of a wind turbine in a wind farm with a number of wind turbines is provided. The monitoring apparatus comprises a sampling device connected to the wind turbines of the wind farm for retrieving at least the yaw angle of a wind turbine to be checked for a yaw misalignment and the yaw angles of a subset of wind turbines of the wind farm. An average value calculator is connected to the sampling device for receiving the yaw angles of the subset of the wind turbines. The average value calculator is adapted to calculate an average value of the received yaw angles. A subtractor is connected to the average value calculator for receiving the average value. In addition, the subtractor is either connected directly or indirectly to the sampling device for receiving the yaw angle of the wind turbine to be checked for yaw misalignment. The subtractor is adapted to calculate a difference between the yaw angle of the wind turbine to be checked and the average value. A comparator is connected to the subtractor for receiving the difference value, which comparator is adapted to compare the difference value with a threshold value and to output an information signal in case the threshold value is exceeded.

The monitoring apparatus allows for monitoring wind turbines in a wind farm for a yaw misalignment by use of the method of checking a wind turbine in a wind farm for a yaw misalignment.

The monitoring apparatus may be implemented as part of the wind farm controller or as a part of a remote data centre, where data from each wind turbine is logged, analyzed and compared in order to identify a yaw misalignment of a wind turbine.

The monitoring apparatus may, in particular, further comprise a selector for selecting a wind turbine of the wind farm to be checked for yaw misalignment and a rule storage with rules relating to generation of subset of wind turbines of the wind farm. A subset generator connected to the selector for receiving information about which wind turbine is selected and to the rule storage for receiving the rules for generating the subset generates, on the basis of the wind turbine to be checked, a subset of wind turbines. Please note that selecting a wind turbine to be checked and a generating a subset of wind turbines may be done before retrieving the yaw angles from the wind farm. In this case, only the yaw angle of the wind turbine to be checked and the yaw angles of the wind farms belonging to the subset need to be retrieved by the sampling device. As an alternative, the yaw angles of all wind turbines in the wind farm may be retrieved by the sampling device. Then, the wind turbine to be checked is selected and the subset is formed. After the selection, the respective yaw angles are selected from the already retrieved yaw angles of all wind turbines. This way of proceeding allows checking all wind turbines in a wind farm for yaw misalignments based on a single retrieved sample of yaw angles.

According to a further development of the monitoring apparatus, a configuration unit may be connected to the rule storage for configuring the rules relating to generation of a subset of wind turbines. Configuring the rules may include selecting a rule from a number of rules already stored in the storage as well as adding a new rule to or deleting a rule from the storage.

Moreover, the monitoring apparatus may comprise an updating device for updating the threshold value used in the comparator. Updating may be done according to what has been said in regard to the threshold value with respect to the method of checking a wind turbine in a wind farm for a yaw misalignment.

Further features, properties and advantages will become clear from the following description of exemplary embodiments in conjunction with the accompanying drawings.

BRIEF DESCRIPTION OF THE DRAWINGS

FIG. 2 schematically shows a first embodiment of the monitoring apparatus.
FIG. 3 shows a second embodiment of the monitoring apparatus.

DETAILED DESCRIPTION OF INVENTION

Figure 1:
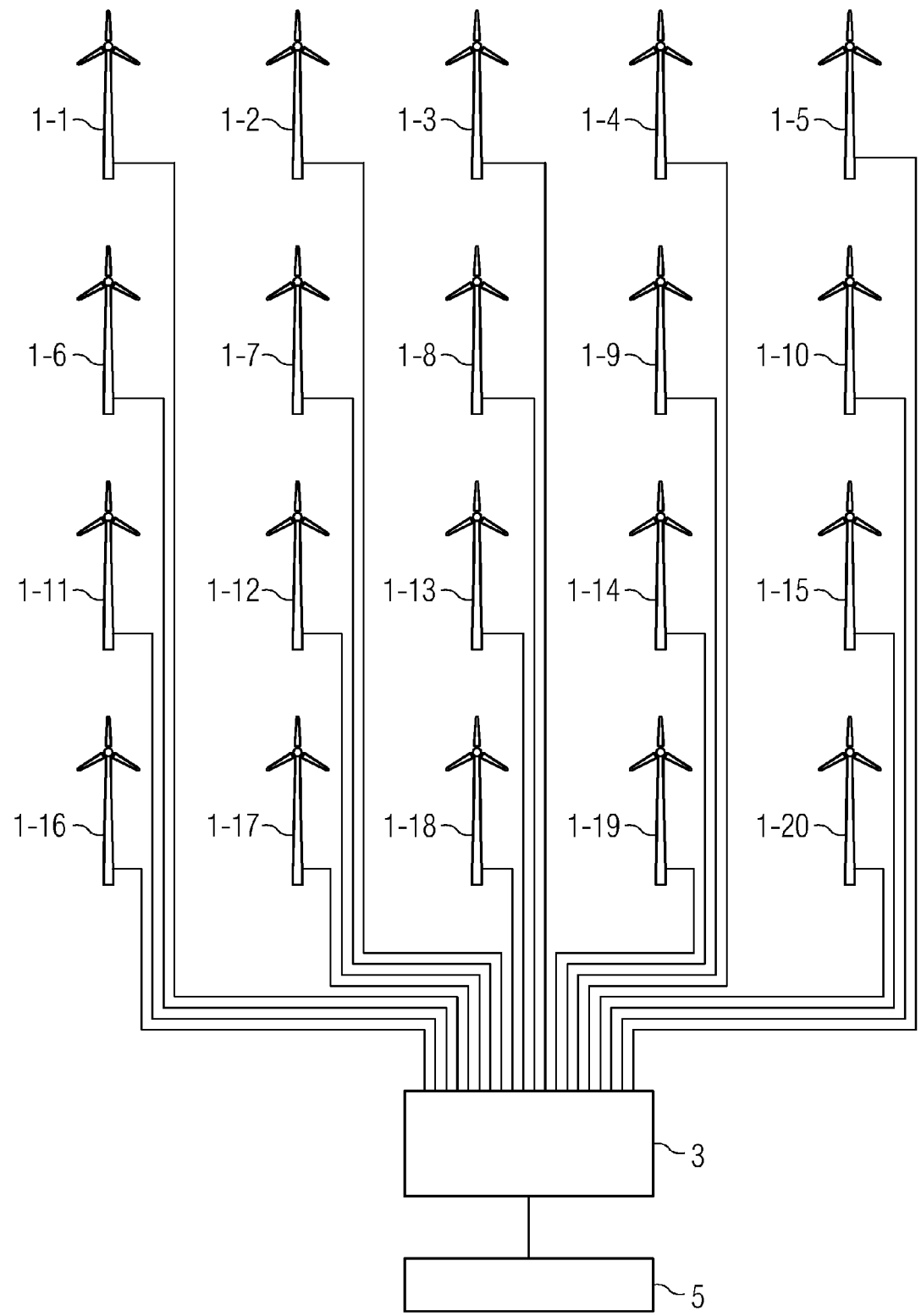
FIG. 1 schematically shows a wind farm.

In the following, the method of checking a wind turbine in a wind farm for a yaw misalignment will be described with respect to FIG. 1. The Figure schematically shows a wind farm comprising 20 wind turbines 1-1 to 1-20 and a wind farm controller 3 that is connected to each of the wind turbines 1-1 to 1-20. The wind farm controller 3 is connected to a remote data controller 5 that is typically not part of the wind farm but located at a different location and connected to the wind farm through a data line or through the internet.

To explain the method of checking a wind turbine of the wind farm for a yaw misalignment it will be assumed that the wind turbine 1-8 is to be checked. For checking this wind turbine the assumption is made that its yaw angle should be approximately the same as the average of the yaw angles of its neighbors or the average of the yaw angles of the whole wind farm. If the yaw angle of the wind turbine 1-8 deviates too much from the average an alarm is set in the remote data centre 5 or at the wind farm location if the wind farm controller allows for setting such an alarm.

For forming the average yaw angle to which the yaw angle of the wind turbine 1-8 is to be compared the yaw angles of the wind turbines 1-2, 1-3, 1-4, 1-7, 1-9, 1-12, 1-13, 1-14, which are the closest neighbors of wind turbine 1-8, are ascertained in the present example and an average value of the yaw angles is formed. In the simplest case, the average value can be formed by calculating the geometric mean of the values. However, it is also possible to forming the root mean square of the yaw angles, any generalized mean or a weighted mean.

If the average yaw angle is established based on the ascertained yaw angles of the subset of wind turbines, the difference between the average yaw angle and the yaw angle ascertained for the wind turbine 1-8 to be checked is formed. If the difference exceeds a given threshold an alarm set to indicate that the technician should inspect the wind turbine in the field.

The threshold used for setting the alarm may be, in the simplest case, a fixed threshold. In more sophisticated implementations of the method, an adaptive threshold may be used that depends on at least one parameter. The parameter may be a parameter of the wind turbine, a parameter of the wind farm, or a parameter of the environment of the wind farm. Please not that it is also possible to make the threshold value dependent on more than one parameter and, in particular, dependent on combinations of parameters of the wind farm, the wind turbine or the environment. For example the threshold value may depend on at least one of the following parameters: accuracy of the yawing system of the wind turbine to be checked, the type of yawing control used in the wind turbine to be checked, the location of the wind turbine to be checked in the wind farm, the number of neighboring wind turbine that are located within a given radius around the wind turbine 1-8 to be checked, the wake distribution in the wind farm, the actual wind speed, the actual amount of wind speed fluctuations, the actual amount of fluctuations in the wind direction, etc.

In addition, or as an alternative, the threshold value may depend on the rule applied for forming the subset of wind turbines that is used for forming the average value of yaw angles. For example, the threshold may be different depending on whether only the nearest neighbors of the wind turbine to be checked are forming the subset or all wind turbines of the wind farm are forming the subset. Please note that, if all wind turbines of the wind farm are forming the subset, it may also be possible to include the wind turbine to be checked into the subset. However, the wind turbine to be checked should be excluded if the number of wind turbines in the wind farm is rather low since a yaw error of the wind turbine to be checked would then have a relatively large effect on the average value. On the other hand, if the number of wind turbines in the wind farm is large the effect of a yaw misalignment of the wind turbine to be checked on the average value can be neglected.

If the threshold value depends on at least one parameter this at least one parameter may be determined continuously or in time steps. Likewise, the threshold may be updated continuously or in time steps based on the determined actual value of the respective parameter. In the present embodiment, a window is defined in which the determined value of the parameter (or parameters) on which the threshold value depend(s) is allowed to vary. Only if the parameter value(s) are found to be out of the window the threshold value is updated. By this measure, fluctuations of the threshold value on a too small time scale can be avoided.

Please note that subsets of wind turbine other than the closest neighbors or all wind turbines of the wind farm can be used in the method. In particular, it is possible to use a number of close neighbors of the wind turbine together with a number of far away wind turbines. Depending on the distribution of wind turbines throughout the area of the wind farm it may either be possible to use a similar number of close neighbors as of far away wind turbines or to use a higher number of close neighbors than far away wind turbines. Which subset of wind turbines will be used may depend on the conditions prevailing throughout the wind farm, for example on whether the wind conditions vary considerably throughout the wind farm. If the wind conditions differ considerably from one location of the wind farm to another it would be advantageous to concentrate on close neighboring wind turbines of the wind turbine to be checked when forming the subset. In addition, whether a wind turbine is included into the subset or not may also depend on whether and/or not it is strongly influenced by the wake of other wind turbines.

The described method of checking a wind turbine for a yaw misalignment can be used for monitoring wind turbines in a wind farm for yaw misalignments. In this monitoring method, all the wind turbines of the wind farm may be checked according to a given scheme for yaw misalignments by comparing the yaw angle of the wind turbine to be checked with an average value of yaw angles of a subset of wind turbines of the wind farm. Please note again, that the term subset may also include a set containing all wind turbines of the wind farm. If the average value is formed from the yaw angles of all wind turbines in the wind farm it is possible to use this average value for checking each wind turbine individually for a yaw misalignment by a comparing the individual yaw angles of each wind turbine to the average. If, on the other hand, real subsets of wind turbines, i.e. subsets not including all wind turbines, are used for forming the average value, for example only the closest neighbors of the wind turbine to be checked, an individual subset is to be formed for each wind turbine to be checked. While the first case needs less computing capacity the second case allows for a more sophisticated adoption of the monitoring method to the location of the wind turbine to be checked in the wind farm.

Both, the method of checking a wind turbine for yaw misalignment and the method of monitoring wind turbines in a wind farm for a yaw misalignment can be implemented in the wind farm controller 3 or in the remote data centre 5. Moreover, it is also possible to implement the method of checking a wind turbine for a yaw misalignment in the wind farm controller 3 and to run the method of monitoring the wind turbines of a wind farm for a yaw misalignment in the remote data centre 5. In the latter case, checking a wind turbine for a yaw misalignment would be initiated by the remote data centre 5 and the method of checking the selected wind turbine for the yaw misalignment would be performed by the wind farm controller 3. If the wind farm controller 3 detects a yaw misalignment it issues an information signal received by the data centre 5 which causes an acoustic or an optic alarm indicating that a wind turbine of the wind farm needs to be checked for wrongly calibrated or defect components in the yawing system and identifies the wind turbine which is to be checked.

A first embodiment of a monitoring apparatus used for performing the method of checking a wind turbine in a wind farm for a yaw misalignment or for monitoring the wind turbines in a wind farm for yaw misalignments caused by wrongly calibrated or defective yaw system components will be described with respect to FIG. 2. The monitoring apparatus comprises a sampling device 7 that is connected to the wind turbines 1-1 to 1-20 of the wind farm for retrieving at least the yaw angle of a wind turbine 1-8 to be checked for a yaw misalignment and the yaw angles of a subset of the wind turbines 1-1 to 1-20 of the wind farm. The monitoring apparatus further comprises a subset generator 9 for generating a subset of wind turbines 1-1 to 1-20 of the wind farm. The subset generator 9 is connected to a selector 11 that allows for selecting a wind turbine 1-8 of the wind farm which is to be checked for a yaw misalignment and to a rule storage 13 that contains rules relating to the generation of a subset of wind turbines of the wind farm. Moreover, the sampling device 7 of the first embodiment is also connected to the selector 11 for receiving information about which wind turbine is to be checked for a yaw misalignment and to the subset generator 9 for receiving the subset of wind turbines that is to be used for forming the average value in relation to the wind turbine to be checked. Furthermore, the monitoring device comprises an average value calculator 15 for forming an average value of the yaw angles of the subset of wind turbines and a subtractor 17 for calculating the difference between the average value and the yaw angle of the wind turbine 1-8 to be checked for a yaw misalignment. A comparator 19 is present in the monitoring apparatus that compares the difference calculated in the subtractor 17 with a threshold and outputs an information signal in case the threshold is exceeded.

If the monitoring apparatus is implemented in the wind farm controller 3 the sampling device may be directly connected to the wind turbines 1-1 to 1-20 for retrieving their yaw angles or indirectly through an intermediate device. In case the monitoring device is implemented in the remote data centre 5 the sampling device is connected to the wind farm controller 3 that forwards the retrieved yaw angles to the sampling device 7.

Based on the information received from the subset generator 9 and the selector 11 the sampling device retrieves the yaw angles of the respective wind turbines, i.e. of the wind turbine to be checked and of the wind turbines forming the subset. The average value calculator 15 is connected to the sampling device 7 and receives from the sampling device 7 the yaw angles of the wind turbines forming the subset of wind turbines. From these yaw-angles an average value is calculated and output to the subtractor 17 that is connected to the average value calculator 15. In addition, the subtractor 17 is connected to the sampling device 7 for receiving the yaw angle of the wind turbine to be checked. The subtractor 17 calculates the difference between the average value and the yaw angle of the wind turbine to be checked and outputs the calculated difference to the comparator 19 that is connected to the subtractor 17. The comparator 19 compares the difference to a threshold value and outputs an information signal if the threshold value is exceeded, as already mentioned above. If the monitoring device is implemented in the wind farm controller 3 the information signal may either trigger an alarm on the site of the wind farm or it will be transmitted to the remote data centre 5 to trigger an alarm there.

The monitoring apparatus according to the first embodiment also comprises an optional updating device 21 that is connected to the comparator 19 and allows for updating the threshold used in the comparator 19 in dependence on a determined parameter value of the wind turbine to be checked, of the wind farm or the environment. The updating device 21 may also be connected to the subset generator 9 to receive the generated subset. It then may be adapted to update the threshold based on the used subset.

A second embodiment of the monitoring device will be described with respect to FIG. 3. Like in the first embodiment, the monitoring apparatus of the second embodiment comprises a sampling device 107, a subset generator 109, a selector 111, a rule storage 113, an average value calculator 115, a subtractor 117 and a comparator 119. The monitoring apparatus of the second embodiment differs from the monitoring apparatus of the first embodiment in the way these devices are connected to each other.

Like in the first embodiment, the sampling device 107 is either directly or indirectly connected to the wind turbines 1-1 to 1-20 of the wind farm for retrieving their yaw angles. However, in the second embodiment the yaw angles of all wind turbines are retrieved by the sampling device 107 irrespective of which wind turbine of the wind farm is to be checked for a yaw misalignment. The selector 111 is connected to the sampling device for receiving the yaw angles of all wind turbines of the wind farm. It allows for a selecting an individual yaw angle of the received yaw angles for checking the wind turbine from which this yaw angle is received for a yaw misalignment. In addition to the sampling device 107, the selector is connected to the subset generator 109 that receives from the selector 111 information about which wind turbine is selected for being checked for a yaw misalignment. In addition to the selector 111, the subset generator 109 is also connected to the sampling device 107 for receiving the yaw angles of all wind turbines of the wind farm. Based on the information on which wind turbine 1-8 is selected the subset generator generates a subset of yaw angles of those wind turbines 1-1 to 1-20 which are to be used for calculating the average value of yaw angles based on rules received from the rules storage 113, which is also connected to the subset generator 109. The subset generator 109 is further connected to the average calculation unit 115 which receives from the subset generator 109 the yaw angles of the wind turbines belonging to the subset and calculates the average value of the received yaw angles. The subtractor 117 is connected to the selector 111 for receiving the yaw angle of the wind turbine that is selected to be checked for a yaw misalignment and to the average value calculator 115 for receiving the average value. Like in the first embodiment, the subtractor 117 calculates the difference between the average value and the yaw angle of the wind turbine to be checked and outputs the difference to the comparator 119 that is connected to the subtractor 117. In the comparator 119 the received difference is compared to a threshold and, like in the first embodiment, an information signal is output by the comparator in case the threshold is exceeded.

Like the monitoring apparatus of the first embodiment, the monitoring apparatus of the second embodiment can be implemented in the wind farm controller 3 or in the remote data centre 5. In both embodiments it is either possible to compare the actual value of the difference to a pair of thresholds, namely a negative threshold and a positive threshold and to output the information signal if the negative threshold is undershot or the positive threshold is overshot, or to compare the absolute value of the difference to a single positive threshold value.

The monitoring apparatus according to the second embodiment also comprises a configuration unit 121 connected to the rule storage 113 by which new rules can be written into the rule storage 113 or rules already stored in the rule storage 13 can be deleted. In addition, if different sets of rules are stored in the rule storage where each set of rules represents a different kind of generating the subset of wind turbines the configuration unit 121 can be used for selecting a set of rules which is to be applied. Although not explicitly mentioned with respect to the first embodiment, such a configuration unit can also be part of the first embodiment, as well. Likewise, it is possible not to provide the second embodiment with a configuration unit, in particular, if only a fixed single set of rules for generating the subset of wind turbines is used in the monitoring apparatus. Moreover, an updating device for updating the threshold(s) used in the comparator like in the first embodiment may also be present in the second embodiment.

The provided methods and apparatus have been described with respect to exemplary embodiments offers the possibility to early detect yaw misalignments which are due to wrongly calibrated or defective yaw system components in a time saving and cost saving manner.

The invention claimed is:

1. A method of checking a wind turbine in a wind farm comprising a plurality of wind turbines for a yaw misalignment, the method comprising:
   ascertaining yaw angles of a subset of wind turbines of the wind farm;
   determining an average yaw angle from the ascertained yaw angles;
   identifying a yaw misalignment of a wind turbine by a deviation of a yaw angle of the wind turbine from the average yaw angle by more than a threshold value.

2. The method as claimed in claim 1, wherein the threshold value is a fixed value.

3. The method as claimed in claim 1, wherein the threshold value depends
   on at least one parameter of the wind turbine and/or
   on at least one parameter of the wind farm and/or
   on at least one parameter of the environment and/or
   on the subset of wind turbines used for establishing the average yaw angle.

4. The method as claimed in claim 3, wherein a value of the at least one parameter of the wind turbine and/or the at least one parameter of the wind farm and/or the at least one parameter of the environment is determined continuously or in time steps, and the threshold is updated continuously or in time steps based on the determined actual value of the respective parameter.

5. The method as claimed in claim 1, wherein the subset comprises close neighbors of the wind turbine to be checked for yaw misalignment.

6. A method of monitoring wind turbines in a wind farm for a yaw misalignment, wherein the wind turbines of the wind farm are checked for a yaw misalignment according to the method as claimed in claim 1.

7. The method as claimed in claim 6, wherein an alarm is set when a yaw misalignment is detected.

8. A monitoring apparatus for identifying a yaw misalignment of a wind turbine in a wind farm comprising a number of wind turbines, comprising:
   an sampling device connected to the wind turbines of the wind farm for retrieving at least the yaw angle of a wind turbine to be checked for a yaw misalignment and the yaw angles of a subset of wind turbines of the wind farm,
   a calculator connected to the sampling device for receiving the yaw angles of the subset of wind turbines, wherein the calculator calculates an average value of the received yaw angles;
   a subtractor connected to the calculator for receiving the average value and connected to the sampling device for receiving the yaw angle of the wind turbine to be checked for yaw misalignment, wherein the subtractor calculates a difference value representing a difference between the yaw angle of the wind turbine to be checked and the average value; and
   a comparator connected to subtractor for receiving the difference value, wherein the comparator compares the difference value with a threshold value and outputs a signal when the threshold is exceeded.

9. The monitoring apparatus as claimed in claim 8, wherein the monitoring apparatus is implemented as part of a wind farm controller or as part of a remote data center.

10. The monitoring apparatus as claimed in claim 8, further comprising:
    a selector for selecting a wind turbine of the wind farm to be checked for yaw misalignment;
    a rule storage storing rules for generating a subset of wind turbines of the wind farm; and
    a subset generator connected
      to the selector for receiving information about which wind turbine is selected and
      to the rule storage for receiving the rules for generating the subset,
    wherein the subset generator generates a subset of wind turbines based on which wind turbine is to be checked.

11. The monitoring apparatus as claimed in claim 10, further comprising:
    a configuration unit connected to the rule storage for configuring the rules relating to the generating of a subset of wind turbines.

12. The monitoring apparatus as claimed in claim 8, further comprising:
    an updating device for updating the threshold value used in the comparator.

* * * * *